United States Patent Office 2,789,030
Patented Apr. 16, 1957

2,789,030

PROCESS OF TOPOCHEMICAL MODIFICATION OF CELLULOSE FABRICS BY REACTING WITH A COPOLYMERIZABLE MONOMER AND COPOLYMERIZING THE REACTION PRODUCT AND PRODUCT PRODUCED THEREBY

Charles A. Fetscher, Troy, N. Y., assignor to Cluett, Peabody & Co., Inc., Troy, N. Y., a corporation of New York No Drawing. Application March 6, 1951,
Serial No. 214,213

16 Claims. (Cl. 8—120)

The use of fabrics made of cellulose materials has been limited in some fields because cellulose and the fabrics made from it lack certain properties important in the specific use. For example, cotton makes a very inferior rug because it is far below wool in soil resistance and in resilience. Numerous treatments have been proposed to endow articles made of these cellulose textile materials, such as fabrics, with virtues they do not naturally possess in order to broaden their field of usefulness or to make possible the successful substitution of cellulose fabrics for more expensive materials. The most important and most successful of these treatments, called finishes, involve the use of resins.

These resin finishes fall broadly into two types. First, the resin coating which completely changes the hand, drape, flexibility, and porosity of the fabric. This finish which is used for glazed chintz, oilcloth, etc., is essentially satisfactory in the narrow field in which it is applicable. The second type of treatment is the superficial modification which retains most of the original characteristics of the fabric but gives it an added virtue, such as greater resilience and shrinkproofness.

These latter modifications are the so-called permanent finishes but they are misnamed, since their one outstanding shortcoming has been their lack of true permanence. I have discovered a means of achieving a wide variety of truly permanent finishes which need not appreciably change the hand, drape, flexibility or porosity of the fabric.

In the prior art a minor portion of the resin finishes made use of vinyl compounds. Vinyl monomers are not readily absorbed by cellulose, and polymerization in intimate association with the fabric is difficult if not impossible to realize. Therefore, these vinyl treatments have made use of the preformed polymer either dissolved in a solvent or emulsified or suspended in water. If a solvent is used, the product is a coated fabric of very limited utility. If an emulsion or suspension is used, a desirable superficial modification may be realized, but the effect is of very limited durability, the material being quickly removed by laundering.

By far the greater part of these prior resin finishes involve condensation resins because the monomeric units or preliminary precondensates are small polar molecules, and such molecules are thought to penetrate the fibers and make it possible to complete the condensation within or at least in very intimate association with the fibers. Various investigators have postulated that chemical combination occurs in some instances, but this has never been incontrovertibly established in any instance, and no resin treatment to date has been demonstrated as being completely washfast. In addition to their limited durability, these so-called permanent resin finishes have other shortcomings. For example, there are a very limited number of monomers or precondensates which can be used for these prior finishes, and hence the possible finishes that can be obtained cannot be varied very widely. The best of these finishes are based on the use of nitrogen resin formers which display chlorine retention that considerably reduces the utility of the fabric.

I have discovered a method of producing a substantially completely permanent finish, and at the same time a manner of utilizing the wide variety of vinyl and allyl monomers which are known, which will give almost an unlimited range of completely permanent finishes, and which do not have chlorine retention.

More particularly I have discovered a process by which the cellulose of a cellulose body such as a fiber, yarn, or fabric, may without destruction of the physical form of the cellulose body, be converted into a cellulose-resin composite in which the cellulose and resinous material are chemically combined. The fact that solution, disintegration or change in the physical form of the cellulose does not take place is a very important feature of my process. The possibility of making various and substantial changes in the physical and chemical properties of cellulose fiber without the necessity of dissolving and regenerating the fiber is extremely attractive.

The present process consists of two steps. In the first, the cellulose is modified topochemically to an unsaturated ester or ether without materially changing its original physical form. This means that a part only of the hydroxy groups of the cellulose are combined with an unsaturated acid or alcohol, and that a chemical reaction takes place without disruption of the cellulose body. It is presumed that the reaction takes place in the surface layers of the cellulose, but the exact location of the reaction sites is not important to the process provided that the reaction is not general enough to cause solution or disintegration of the cellulose body. These changes may be represented in abbreviated formulae as follows, but it should be understood that the indicated reaction takes place only to a limited degree, and only a relatively small percentage of the cellulose hydroxy groups are combined with the reactant. In the formulae below Cell-OH is used to represent a portion of a cellulose molecule as present in a cellulose fiber either native or regenerated.

(1) Cell-OH+R¹COOH→Cell-OCOR¹+H₂O
(2) Cell-OH+R²OH→Cell-OR²+H₂O

In these reactions R¹ is an alkyl group containing at least one olefinic group (=C=C=) and R² is also an alkyl group containing at least one olefinic group. In Reaction 1, R¹COOH represents an acid containing at least one olefinic (=C=C=) group and capable of polymerization of copolymerization. In practice only the shorter chain acids having less than about 5 carbon atoms in an alkyl group, such as acrylic, methacrylic, crotonic, isocrotonic and maleic acids, are useful in this step. The shorter the chain the more active the acid. Similarly, Reaction 2 represents the reaction of cellulose with an unsaturated alcohol containing at least one olefinic (=C=C=) group. Allyl, methallyl and crotyl alcohol are the only unsaturated alcohols I have found useful in this step. Reaction 1 is preferred, because the ester derivatives are usually more reactive in polymerization than the ether derivatives.

It is to be understood that the reactions as given hereinbefore are merely theoretical to represent the generalized formation of the products. In practice it is seldom practical to use the free acid or alcohol, and usually acid anhydrides, acyl halides, alcoholates or allyl halides are used, but these are to be considered as included under the generic name of unsaturated hydroxy-containing monomers, as equivalents.

The extent of reaction in this first step need not be great. I have found that as little as one unsaturated substituent per six glucose anhydride rings gives a modified cellulose which is perfectly operable in my process. It is probable then that the degree of substitution may be as little as one per eight to ten glucose anhydride rings. Greater substitution of course involves more expense and greater possibility of damage but gives a more active modification. The upper limit is set by the fact that these derivatives become soluble or at least highly swellable in the reaction systems, and the physical form which I wish to preserve is lost through solution or fusion of the individual fibers, if the reaction is carried too far. For example, I have been able to modify the cellulose to the extent of about one substituent per ring without extensive damage or loss of discreteness of the fibers. I prefer in this preliminary modification to prepare a product showing from one unsaturated substituent per glucose anhydride ring to one such substituent per ten such rings. In other words the material preferably should average about one substituent on from 10 to 100% of the glucose anhydride units in the cellulose molecule.

The first step, the topochemical conversion of the cellulose into a polymerizable monomer, is not per se the essence of this invention, although many of the unsaturated derivatives I have prepared topochemically appear to be new. In the second step, the polymerizable cellulose derivative is copolymerized with one or more of the great number of polymerizable monomers which are known. My observations indicate that any monomer which will copolymerize with methyl methacrylate will copolymerize with cellulose methacrylate or with cellulose acrylate. Allyl cellulose is much less reactive but I have been able to copolymerize it with vinyl acetate and with methyl methacrylate. Apparently it will react with a large number of monomers but much more slowly than does cellulose methacrylate.

A typical example of the second step might be formulated as follows:

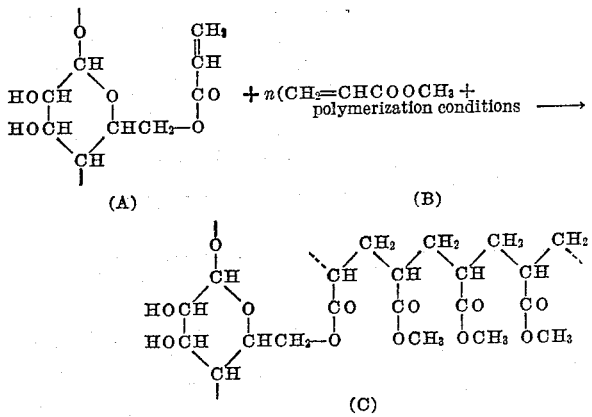

Molecule A in this reaction represents a portion of a cellulose molecule which bears an acrylate residue as a side chain. For convenience, the ester group is illustrated as involving the primary alcohol group of the cellulose but of course this need not be the case. Molecule B represents a large number ($n$) of methyl acrylate molecules. Under polymerization conditions, viz. peroxide catalyst and proper temperature; the methyl acrylate molecules combined with each other and with the vinyl group attached to the cellulose to form a long chain molecule which is chemically combined with the cellulose as pictured at C that represents part of the final molecule. The vinyl resin grows in single chain molecules at discrete sites along the cellulose molecule. There is no collection of molecules at one spot as would be necessary to glue the fibers and yarns together and as is the case when fabric is treated with a polymer emulsion since even the finest emulsion particles contain an enormous number of molecules. There may, of course, be cross-linking by the growing chains of two or more cellulose molecules or several sites on one cellulose molecule but in theory there is little or no chemical cross-linking or physical adhesion between individual fibers or yarns. In practice this is found to be true. There is no evidence of combination or adhesion between the several fibers of a yarn or fabric. That is one of the outstanding advantages of this process; very large amounts of resin can be applied to cellulose textile materials without appreciably altering the flexibility and drape. Cotton which had been previously topochemically converted to cellulose methacrylate has been combined with as much as two hundred percent of methacrylic acid without appreciable change in the hand except that the fabric was now three times as heavy as the control.

This is a completely new type of treatment and in no way a modification of prior methods. It has three important features. First, the resin is part of the cellulose and cannot be removed by physical means. This statement is absolute, the resin and cellulose are one entity and cannot be separated except by hydrolysis of the primary ester or ether linkage. Second, the resin chains grow at discrete sites on the cellulose molecules and there are no collections of resin molecules in one site to glue the fibers together. Because of this, more resin can be applied by this process than can be applied by any other process without sacrifice of the flexibility, drape, and porosity of the textile. The third feature is that the process is topochemical, and while offering a means of producing fundamental and drastic changes in the physical properties of the cellulose body, does not involve the costly steps of solution and regeneration.

By way of illustration several examples of specific applications of my process are offered. These examples by no means exhaust the versatility of the process and are not to be construed as limiting the invention. The first six examples demonstrate the topochemical modification of the cellulose to a copolymerizable derivative.

*Example 1.*—A sample of all cotton broadcloth was soaked five minutes in 85% formic acid at room temperature, then it was removed and squeezed to retain about its own weight of formic acid. The sample was then immersed in a solution of the following: 74.5% methacrylic acid, 25% methacrylic anhydride and .5% perchloric acid at 30° C. The temperature rose to 42° C. very quickly and was held there, by cooling, for five minutes. The sample was then removed, squeezed well, rinsed with tap water and dried. Samples treated according to these directions have retained from 80 to 110% of their original tensile strength and show from 12 to 15% methacryl radical by saponification.

*Example 2.*—A sample of all viscose rayon gabardine was pretreated with formic acid as above and then soaked in a solution of 75% methacrylic acid, 16.5% chloracetic anhydride, 8.2% methacrylic anhydride, and .3% perchloric acid at 42° C. for 1½ minutes. The temperature tended to rise but was maintained below 45° C. during the treatment. The sample was then squeezed, washed and dried. This sample showed 11% methacryl content and its tensile strength was equal to that of the control.

*Example 3.*—A sample of combed cotton yarn (30's) was soaked five minutes in 85% formic acid, then centrifuged to about 100% retention. The sample was then immersed in a solution of 78% acrylic acid, 17% chloracetic anhydride, 4.6% acrylic anhydride and .4% perchoric acid at 38° C. The temperature rose immediately but by cooling it was held below 45° C. for the five minutes of the treatment. The yarn was then removed, centrifuged, washed with water and dried. The product showed 10–12% acryl content.

*Example 4.*—A sample of cotton broadcloth pretreated with formic acid as in Example 1 was passed through a solution of 75% methacrylic acid, 16.5% chloracetic anhydride, 8.2% methacrylic anhydride and .3% perchloric acid and squeezed to about 100% pickup. It was then placed in an oven at 50° C. for 5 minutes. The sample was then washed and dried. It showed 6.5% methacryl content equivalent to one substituent per 5.5 glucose anhydride units in the cellulose molecules. The material was perfectly satisfactory for the second part of the process.

*Example 5.*—A sample of cotton sliver was soaked in 85% formic acid for five minutes then centrifuged to approximately 100% retention of formic acid. A treating mixture was prepared by heating together two parts crotonic acid and one part chloracetic anhydride for three hours at 150° C. This mixture was cooled to 25° C. and perchloric acid equal to about .3% added to it. The cotton sliver was immersed in this bath and the temperature maintained below 30° C. for the three minutes of the treatment. The sliver was then removed, centrifuged, washed with water and dried. The fibers showed 17% crotonyl content and a trace of chlorine sufficient to indicate about 1% combined chloracetic acid. It can be considered a cellulose crotonate and the minor constituent of cellulose chloracetate ignored.

*Example 6.*—A sample of cotton yarn (35's) wound on a perforated glass cylinder was wet with warm water containing a trace of wetting agent, then soaked for 20 minutes in a 25% solution of caustic soda at room temperature. It was then removed and after the excess caustic solution had drained off it was placed in a kettle and covered with a 10% solution of methallyl bromide in carbon tetrachloride. The cylinder was fixed to a shaft and rotated while the solution was refluxed. During the first half hour of reflux, caustic soda equivalent to about one-half of the methallyl bromide present was added as a 25% solution. The heating was then continued for 16 hours. At the end of this time the yarn was removed, washed thoroughly with hot water, centrifuged, and dried. Analysis showed a methallyl content of 11%.

Since this first step of my process need, and preferably does, involve only a small fraction of the hydroxy groups of the cellulose, as few as 4% of the total has been found satisfactory, it is quite apparent that the process does not require pure cellulose as a substrate. It is perfectly operable on cellulose which has been slightly modified by some previous treatment. Thus I have successfully treated viscose rayon after it had been modified by glyoxal or formaldehyde. In these samples the amount of aldehyde combined was equivalent to about one hydroxy group per 50 to 100 glucose anhydride rings. I have also been able to use cotton samples which had been topochemically esterified with acetic acid or topochemically etherified to the carboxymethyl ether. In these latter samples the degree of presubstitution corresponded to one substituent per about fifteen glucose anhydride units. On the other hand textile cellulose acetate is completely inoperable in my process. Therefore, the process will tolerate minor premodification of the cellulose but not extensive modification.

It appears that the process requires a substrate which is substantially cellulose, that is cellulose which contains not more than one substituent to about ten glucose anhydride rings. This means that only about 95% of the hydroxy groups need to be free and available.

Although the cellulose of the substrate cannot be greatly modified, it is nevertheless true that the cellulose may be blended with substantial amounts of non-cellulosic material. The only limitation is that the accompanying non-cellulose material not be destroyed or appreciably damaged by the treating solutions. For instance a blend of cotton and nylon was successfully treated exactly as the cotton broadcloth of sample one. However, since there is a possibility of damage to the nylon by the formic acid soak, I prefer to substitute a swelling in glacial acetic acid. Thus with minor modifications the treatment can be made operable on blends of cotton or viscose rayon with any textile fiber except those which, like acetate rayon, are soluble in or very sensitive to these organic solvents. Competition by reactive groups in the non-cellulosic constituent with the cellulose for the modifying agent is not a problem. In general cellulose is much more reactive than the other textile materials under the conditions used and slight modification of the noncellulose material would not preclude the realization of the end effects.

Although the process is operable on slightly modified cellulose and on cellulose-noncellulose mixtures there appears to be little advantage in using anything but unmodified cotton or rayon. The variety of end effects realizable from cotton or rayon by the present invention make modification of the starting material by other processes such as by glyoxal stabilization of doubtful commercial utility.

The second step of the process comprises copolymerizing the polymerizable derivative of cellulose formed in step one with one or more copolymerizable, active olefine compounds containing at least one active double bond, such as vinyl or allyl monomers. This copolymerization with another and mobile monomer is an extremely important part of this process. Not only does it lead to new and valuable products many of which could not be formed in any other way but it is the only way I have found to utilize the potential polymerizability of the cellulose derivatives. These derivatives, which are made topochemically necessarily have a very low degree of substitution since destruction of, or extensive damage to the fiber form takes place if substitution is carried much beyond about one per ring. The derivatives are therefore analogous to a dilute solution of a polymerizable monomer in which the reactive centers are not free to move and approach each other. Such a system would be polymerizable in theory but polymerization would be difficult or impossible to realize in practice. However, the introduction of a freely moving monomer permits the fixed centers to react and form a copolymer. The topochemically formed allyl, methacryl, and crotyl ethers and the crotonic ester of cellulose substituted as far as is possible without disintegration of the fibers show no indication of homopolymerization by any of the following tests, loss of solubility, change in viscosity, change in rate of saponification, or appreciable change in strength or other physical property. When topochemical esterification with acrylic or methacrylic acid is carried as far as possible without drastic loss in fiber strength, the products, showing about one substituent per ring, do show greatly reduced solubility after exposure to polymerizing conditions indicating a degree of polymerization or at least dimerization. However, there are no important changes in physical properties of the topochemically modified cellulose, and there does not seem to be any justification by end use values for the self-polymerization of these topochemically formed polymerizable cellulose derivatives. However, copolymerization with one or more of the great number of vinyl and allyl monomers converts these otherwise relatively useless derivates into a very large number of new and valuable products. Since the thory and practice of copolymerization is well established and known to those acquainted with the field, there is no need to exemplify it extensively here. The important problems are mechanical and arise from the fact that one of the monomers, the unsaturated cellulose derivative, is a solid and cannot be fused or dissolved, if fusion or a solution could be obtained, without sacrificing much of the utility of the process.

By way of example, I have copolymerized the following cellulose derivatives: cellulose acrylate 6–14% acryl; cellulose methacrylate 6–23% methacryl; cellulose crotonate 9–25% crotonyl; allyl cellulose 5–10% allyl; and methallyl cellulose 6–11% methallyl; each with at least two of the following and the acrylate and the methacrylate esters with all of the following: acrylic acid, methacrylic acid, methyl acrylate, ethyl acrylate, methyl methacrylate, styrene, divinyl benzene, acrylonitrile, vinylidene chloride, vinyl acetate and allylidene diacetate. I have not been able to discover any monomer which is known to form copolymers which will not copolymerize with one or more of the above cellulose derivatives. It will be noted that all of these types of compounds have one active double bond, which is not more than one bond removed from an end of a carbon chain. The weight of resin added to the cellulose ranged from 20 to 200%, this later figure being realized in only one experiment. The fabrics with large quantities of combined resin were, of course tighter and stiffer than originally, but there was no evidence that the fibers or yarns were cemented together. The products were still textiles, porous and flexible but very greatly changed in various ways. Most showed greatly increased strength, in some the water regain was cut to 2% and in others it was raised to 35%. Some were very resilient. These new properties were not lost nor reduced in ten one-hour launderings. I have not attempted to predict the utility of any of these samples but it is self-evident that many of the almost unlimited number of products which can be prepared will have considerable value.

*Example 7 (methyl methacrylate).*—A sample of cotton broadcloth pretreated as in Example 1 and showing 12.7% methacrylyl residue and a control sample of the same broadcloth were heated in a 30% emulsion of methyl methacrylate containing 1% Arquad S as emulsifier and .5% Porofor N as catalyst. The Arquads are quaternary ammonium salts of the type $RN(CH_3)_3Cl$ supplied by Armour and Co., Chicago, Ill. In Arquad S, R is a mixture of 10% $C_{16}H_{33}$; 10% $C_{18}H_{37}$; 35% $C_{18}H_{35}$; and 45% $C_{18}H_{33}$. Porofor N is a German trade name for azo (bis-isobutyronitrile),

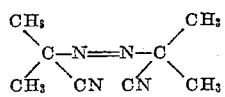

After 2 hours at 70° C. the polymerization was considered complete and the samples removed and rinsed. Then they were laundered thoroughly. After drying they were weighed. The treated piece had increased in weight by 48%, while the control showed an increase of 15%. After five more hour launderings the treated piece still showed 48% increase over starting weight while the control was very nearly back to its original weight being only about 2% high.

*Example 8 (styrene and divinyl benzene).*—A sample of broadcloth treated as the yarn of Example 3 and showing 8% acrylyl residue together with an untreated control was immersed in an unagitated emulsion of 25% styrene, 5% divinyl benzene with Arquad S as emulsifier and Porofor N as catalyst and heated for 2½ hours at 70° C. After five launderings the treated material showed a 54% gain in weight while the untreated still retained only six.

*Example 9 (acrylonitrile).*—An emulsion containing 20% acrylonitrile, 1% Arquad S, 0.5% Lupersol DDM, and 0.5% triethylene tetramine was used to treat a sample of cotton prepared according to Example 1 and showing 10.5% methacrylyl residue and a control. Lupersol DDM is a catalyst supplied by the Novadel-Agene Corp., Buffalo, N. Y. It consists of 60% methyl ethyl ketone peroxide in dimethyl phthalate. The polymerization was extremely vigorous and complete in 20 minutes at 65° C. The treated sample picked up 55% while the control showed the unusual gain of 30%. However, while the weight of the treated piece was essentially unchanged by laundering, the resin was rapidly removed from the control. The treated piece showed greatly reduced water absorption compared with untreated cotton.

*Example 10 (methacrylic acid).*—A sample of the same fabric used in Example 8 and a control were immersed in a solution of 10% methacrylic acid in water containing .25% hydroxy heptyl peroxide and .25% triethylene tetramine and the mixture held at 70° C. for two hours. By this time the mixture had developed moderate viscosity and the samples were stiff. They were rinsed thoroughly to remove as much of the uncombined polymethacrylic acid as possible. After drying, treated sample showed a 66% increase in weight but control had gained 44%. After five 1 hour launderings, treated sample showed 55% increase while control still retained 18%. This appears to show that polymethacrylic acid is somewhat substantive to cotton and quite difficult to remove. However, it is obvious that copolymerization with polymerizable cotton forms a much more permanent attachment. In addition, there was a remarkable and unexpected difference between the samples. Before laundering when the two samples were similar in resin content, control was stiff and brittle, while the treated piece felt heavier and was very resilient. It appears that chemical combination with the modified cellulose masks and modifies the properties of the resin to give an effect in this instance dramatically from that produced on the control which is merely saturated with the resin.

*Example 11.*—A sample of cotton broadcloth was treated as in Example 1 and showed upon analysis 11.2% methacrylyl radical. This material was used in Examples 11, 12 and 13. A piece of the material together with an untreated piece of the same broadcloth was immersed in an emulsion of 10% allyl acrylate containing 2% Arquad S as emulsifier and ½% Porofor N as polymerization catalyst. After one hour at 70° C. the polymerization appeared complete and the samples were removed and laundered. The following laundry resistant gain was found.

|  | Control | Treated #11 |
|---|---|---|
| Before Treatment_____g__ | 2.00 | 2.74 |
| After Laundering_____g__ | 2.00 | 6.54 |
| Increase_____g__ | None | 3.80 |
| Percent Increase_____ | None | 139 |

*Example 12.*—Samples as in #11 were immersed in a 20% emulsion of allyl methacrylate with 2% Arquad S and ½% Porofor N. After one hour at 70° C. they were removed and laundered. The findings were as follows:

|  | Control | Treated #12 |
|---|---|---|
| Before Treatment_____g__ | 1.90 | 3.12 |
| After Laundering_____g__ | 1.98 | 6.10 |
| Increase_____g__ | .08 | 2.98 |
| Percent Increase_____ | 4 | 95 |

*Example 13.*—Samples as in #11 were immersed in a 30% emulsion of vinyl methacrylate with 2% Arquad S and ½% Porofor N. After one hour at 70° C. they were removed and laundered. The following weight changes were found:

|  | Control | Treated #13 |
|---|---|---|
| Before Treatment_____g__ | 2.60 | 2.02 |
| After Laundering_____g__ | 2.76 | 3.48 |
| Increase_____g__ | .16 | 1.46 |
| Percent Increase_____ | 6 | 72 |

The highly concentrated emulsions used in the examples are not necessary for the operation of the process. Laundry-proof weight gains of 10 to 20% have been realized from emulsion containing only 2% monomer. In these more dilute systems the utilization of the monomer is more complete and the process more economical. Examples 11, 12 and 13 were repeated exactly as before but with 5% emulsions of the monomers with the following results.

*Example 11A.*—5% allyl acrylate—wash-fast—weight gain 61%.

*Examples 12A.*—5% allyl methacrylate—wash-fast—weight gain 47%.

*Example 13A.*—5% vinyl methacrylate—wash-fast—weight gain 28.2%.

I have found that difunctional monomers are extremely useful in this process.

There are a great many polymerizable derivatives of cellulose possible, but since the identity of the derivative is important only in its ease of formation and reactivity and has little to do with the character of the final finish, it is obviously desirable to use those derivatives which are most easily prepared from commercially available material. With this restriction, the preferred list is quite small, and acrylic acid and its two methyl derivatives, methacrylic and crotonic acids, allyl alcohol and its two methyl derivatives, methallyl and crotyl alcohols, are about the only compounds which react with cellulose sufficiently readily to permit the relatively mild conditions which must be used for topochemical modification without extensive damage and are sufficiently active in copolymerization to be useful in the second part of the process. The vinyl ether of cellulose might be useful but I have not been able to prepare it topochemically. The maleic and itaconic esters of cellulose can be prepared topochemically and will copolymerize with other monomers but are inferior in both reactions to the six preferred compounds. It is well to emphasize again that the expressions "reaction with the acid" and "reaction with the alcohol" are used only for convenience, it being understood that it is seldom practical to use the free acid in cellulose ester formation or the free alcohol in the formation of cellulose alkyl ether. For esterification the acid anhydride or the acyl halides are much better and for etherification a Williamson's type reaction with the alkyl halide and soda cellulose is useful.

It is obvious that the reactivity of the cellulose derivative is a function of the number of olefinic substituents in the cellulose chain and not directly related to the weight percent of substituent, which value is based upon the molecular weight of the substituent residue. It is, however, sometimes easier to appreciate the extent of reaction in terms of weight percent. The interdependence of the weight percent substituent and the number of substituents per glucose anhydride ring is given in the table below for the six reagents preferred.

my knowledge the monomeric units of a condensation process, for instance, hexamethylene diamine or adipic acid are never called polymerizable. In any case, I use the words polymerizable and polymerization solely for vinyl or allyl type compounds and processes. My invention is not concerned with any glyptal type condensation which may be possible with cellulose. The word unsaturated as used in the foregoing disclosure and following claims refers only to carbon to carbon unsaturation.

My treatment involves cellulose, not only as an active chemical compound, but also cellulose as a cellulose body with certain physical characteristics. For my process the compound should be relatively free from chemical modification of its polyhydric alcohol structure. At least about 95% of the alcohol groups should be unsubstituted and available. Physically, on the other hand, there is more latitude. The cellulose may be accompanied by considerable portions of non-cellulosic material which acts as an inert diluent. It may also be native cellulose as cotton or ramie or regenerated cellulose as viscose or cuprammonium rayon. It is only necessary that it have sufficient strength for textile utility. This is a process for the modification of fibers, yarns, or fabrics, and is not intended for, nor economical for, the treatment of cellulose solutions, powders, or fibers which are too weak to be made into yarns. Therefore, the word cellulose as used in this disclosure and the following claims implies these limitations. The cellulose should not be substantially modified nor degraded beyond the minimum chain length for textile utility but the cellulosic body need not be entirely cellulose.

The copolymerizable cellulose derivatives will be combine with polymerizable monomers of any of the several types as follows, where X is the atom, or group, which activates the double bond:

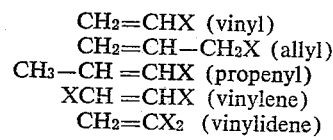

$$CH_2=CHX \text{ (vinyl)}$$
$$CH_2=CH-CH_2X \text{ (allyl)}$$
$$CH_3-CH=CHX \text{ (propenyl)}$$
$$XCH=CHX \text{ (vinylene)}$$
$$CH_2=CX_2 \text{ (vinylidene)}$$

These compounds although differing in degree of reactivity are similar in that they will take part in addition copolymerization. For convenience I call them active olefine compounds. Particularly useful members of this

| Substituents per ring | Percent Acryl $CH_2=CHCO-$ | Percent Methacryl $CH_2=CCH_3CO-$ | Percent Crotonyl $CH_3CH=CHCO-$ | Percent Allyl $CH_2=CHCH-$ | Percent Methallyl $CH_2=CCH_3CH_2-$ | Percent Crotyl $CH_3CH=CHCH_2-$ |
|---|---|---|---|---|---|---|
| 0.05 | 1.67 | 2.08 | 2.08 | 1.25 | 1.67 | 1.67 |
| .10 | 3.28 | 4.09 | 4.09 | 2.46 | 3.28 | 3.28 |
| .15 | 4.85 | 6.00 | 6.00 | 3.66 | 4.85 | 4.85 |
| .20 | 6.37 | 7.87 | 7.87 | 4.82 | 6.37 | 6.37 |
| .25 | 7.83 | 9.64 | 9.64 | 5.95 | 7.83 | 7.83 |
| .30 | 9.26 | 11.34 | 11.34 | 7.07 | 9.26 | 9.26 |
| .35 | 10.6 | 12.9 | 12.9 | 8.15 | 10.6 | 10.6 |
| .40 | 12.0 | 14.6 | 14.6 | 9.21 | 12.0 | 12.0 |
| .45 | 13.3 | 16.1 | 16.1 | 10.2 | 13.3 | 13.3 |
| .50 | 14.5 | 17.6 | 17.6 | 11.3 | 14.5 | 14.5 |
| .55 | 15.8 | 19.0 | 19.0 | 12.2 | 15.8 | 15.8 |
| .60 | 17.0 | 20.4 | 20.4 | 13.2 | 17.0 | 17.0 |
| .65 | 18.1 | 21.7 | 21.7 | 14.2 | 18.1 | 18.1 |
| .70 | 19.3 | 23.0 | 23.0 | 15.1 | 19.3 | 19.3 |
| .75 | 20.4 | 24.3 | 24.3 | 16.0 | 20.4 | 20.4 |
| .80 | 21.4 | 25.5 | 25.5 | 16.9 | 21.4 | 21.4 |
| .85 | 22.5 | 26.7 | 26.7 | 17.8 | 22.5 | 22.5 |
| .90 | 23.5 | 27.8 | 27.8 | 18.6 | 23.5 | 23.5 |
| .95 | 24.5 | 29.0 | 29.0 | 19.5 | 24.5 | 24.5 |
| 1.00 | 25.4 | 30.0 | 30.0 | 20.3 | 25.4 | 25.4 |

Note.—In this table, percentages are by weight.

Chain formation by the condensation of two di or poly functional compounds is sometimes referred to as condensation polymerization but I prefer to restrict the word polymerization to its more exact meaning, that is, vinyl or allyl type poly-combination. The word polymerizable is less ambiguous in its use. A polymerizable monomer inevitably means a vinyl or allyl type compound capable of polymerization through its active olefine linkage. To class in my process are those active olefines containing two active double bonds such as vinyl methacrylate with two vinyl groups and those of two active double bonds of different types such as allyl acrylate with both a vinyl and an allyl linkage.

The name "ether" in today's usage does not, strictly speaking, include esters but at one time it did. The Condensed Chemical Dictionary published in 1920 by the Chemical Catalog Co. on page 210 under the word ether lists ethyl acetate, amyl acetate, ethyl benzoate and fifteen other esters. J. B. Cohen's Practical Organic Chemistry, published in 1930 and used in American colleges at least as late as 1935 gives acetic ether as a second choice name for ethyl acetate (p. 96). The reason for including the two types under one name is of course that both contain the specific ether linkage:

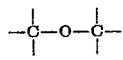

In ethers per se it is unmodified, while in esters it is modified by the presence of the adjacent carbonyl group:

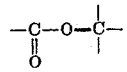

Hence, I am justified in designating the ester and ether cellulose derivatives of my process broadly by the generic class of ether-type compounds, which will include all products of the type R-X-O-Cell, where R is an unsaturated alkyl group, X is $CH_2$ or CO, and O-Cell is the cellulose residue. Therefore, I may call the products of the first step of my process copolymerizable ether-type derivatives. Of these ether-type derivatives I prefer the esters as more reactive in the second step of the process than are the ethers of current usage.

It will be understood that various changes in the details and materials which have been herein described in order to explain the nature of the invention may be made by those skilled in the art within the principle and scope of the invention as expressed in the appended claims.

This application is a continuation-in-part of my prior co-pending application, Serial No. 148,511, filed March 8, 1950, now abandoned.

I claim:

1. The method of treating a textile material containing cellulose fibers, in any physical form to impart to it a wide range of finishes that are completely permanent under launderings, which comprises chemically reacting a part only of the hydroxy groups of the cellulose of said fibers with an unsaturated, polymerizable compound capable of reacting with an alcohol, and selected from the group consisting of acrylic acid and its two methyl derivatives, methacrylic and crotonic acids, and allyl alcohol and its two methyl derivatives, methallyl and crotyl alcohols, to provide an unsaturated, polymerizable derivative of cellulose to an extent sufficient to give at least one substituent on from 10% to 100% of the glucose anhydride units in the cellulose molecule, and terminating such chemical reaction before the cellulose fibers lose their physical fibrous form, and then copolymerizing such reaction product of the cellulose fibers with a copolymerizable, active olefinic monomer containing at least one active double bond, not more than one bond removed from an end of a carbon chain.

2. The method of treating a textile material, containing cellulose fibers, in any physical form to impart to said material a wide range of finishes completely permanent under launderings, which comprises reacting topochemically and partially, but not completely, the cellulose of the cellulose fibers of said textile material with a compound selected from the group consisting of acrylic acid and its two methyl derivatives, methacrylic and crotonic acids, and allyl alcohol and its two methyl derivatives, methallyl and crotyl alcohols to provide an unsaturated, polymerizable derivative of cellulose that contains the linkage C-O-C at the site of the reacted hydroxy group, until the reaction employs a part only of the hydroxy groups sufficient to give at least one substituent on from 10% to 100% of the glucose anhydride units in the cellulose molecule, terminating such conversion before the cellulose fibers lose their physical fibrous form, and then copolymerizing such partially converted cellulose derivative of the cellulose fibers with a copolymerizable monomer.

3. The method of treating a textile material, containing cellulose fibers, in any physical form to impart to it a wide range of finishes that are completely permanent under launderings, which comprises topochemically and partially reacting the cellulose of said fibers with a compound selected from the group consisting of acrylic acid and its two methyl derivatives, methacrylic and crotonic acids, and allyl alcohol and its two methyl derivatives, methallyl and crotyl alcohols to provide an unsaturated, polymerizable monomer derivative of cellulose that contains the linkage C-O-C at the site of the reacted hydroxy group, until the reaction employs a part only of the hydroxy groups sufficient to give at least one substituent on from 10% to 100% of the glucose anhydride units in the cellulose molecule, and while maintaining the cellulose fibers in physical fibrous form, and then copolymerizing this derivative with a copolymerizable monomer containing at least one active double bond, at a terminal carbon atom.

4. The method of treating a textile material containing cellulose fibers, in any physical form to impart to it a wide range of finishes that are completely permanent under launderings, which comprises reacting the cellulose of said fibers, with an unsaturated compound selected from the group consisting of acrylic acid and its two methyl derivatives, methacrylic and crotonic acids, and allyl alcohol and its two methyl derivatives, methallyl and crotyl alcohols, to provide an unsaturated, polymerizable derivative of cellulose, while maintaining the cellulose fibers in physical fibrous form and employing a part only of the hydroxy groups sufficient to give at least one substituent on from 10% to 100% of the glucose anhydride units in the cellulose molecule, and then copolymerizing this cellulose derivative with a copolymerizable monomer containing at least one active double bond, not more than one bond removed from an end of a carbon chain.

5. The method of treating a textile material, containing cellulose fibers, in any physical form to impart to it a wide range of finishes that are completely permanent under launderings, which comprises chemically combining a part only of the hydroxy groups of the cellulose of said fibers sufficient to give at least one substituent on from 10% to 100% of the glucose anhydride units in the cellulose molecule, with an unsaturated compound selected from the group consisting of acrylic acid and its two methyl derivatives, methacrylic and crotonic acids, and allyl alcohol and its two methyl derivatives, methallyl and crotyl alcohols, to provide an unsaturated, polymerizable derivative of cellulose, terminating the reaction before the cellulose fibers of the textile material lose their physical form, and then copolymerizing such reaction product of the cellulose textile fibers with a copolymerizable, active olefinic monomer containing at least one active double bond not more than one bond removed from an end of a carbon chain.

6. The method of treating a textile material, containing cellulose fibers, in any physical form to impart to said material a wide range of finishes that are completely permanent under launderings, which comprises reacting the cellulose of said fibers with a carbon to carbon unsaturated, polymerizable compound selected from the group consisting of acrylic acid and its two methyl derivatives, methacrylic and crotonic acids, and allyl alcohol and its two methyl derivatives, methallyl and crotyl alcohols, to provide an unsaturated, polymerizable, derivative of cellulose, terminating the reaction before said fibers lose their physical fibrous form, and then copolymerizing such cellulose derivative on said fibers with a copolymerizable vinyl monomer.

7. The method of treating a textile material, containing cellulose fibers, in any physical form to impart to said material a wide range of finishes that are completely permanent under launderings, which comprises reacting the cellulose of said fibers with a carbon to carbon, unsaturated polymerizable compound having less than five carbon atoms in an alkyl group and capable of reacting with an alcohol, to form on said fibers an unsaturated, polymerizable derivative of cellulose, terminating the reaction before said fibers lose their physical fibrous form, and then copolymerizing such cellulose derivative on said fibers with a copolymerizable allyl monomer.

8. The method of converting a fibrous textile material, containing cellulose fibers, in any physical form and without loss of its original physical form, into a cellulose-resin composite in which the cellulose and resin are chemically combined, and adjacent fibers are physically discrete, which comprises first reacting upon said material with an unsaturated, polymerizable compound having less than five carbon atoms in an alkyl group and capable of reacting with an alcohol, to form on said fibers with the cellulose thereof, an unsaturated, polymerizable derivative of cellulose, terminating the reaction before said fibers lose their physical fibrous form, and then copolymerizing such cellulose derivative on the fibers with a copolymerizable monomer.

9. The method of converting a fibrous textile material, containing cellulose fibers, in any physical form and without loss of its original physical form, into a cellulose-resin composite in which the cellulose and resin are chemically combined, and adjacent fibers are physically discrete, which comprises first reacting upon said material with an unsaturated, polymerizable compound selected from the group consisting of acrylic acid and its two methyl derivative, methacrylic and crotonic acids, and allyl alcohol and its two methyl derivatives, methallyl and crotyl alcohols, and employing a part only of the hydroxy groups sufficient to give at least one substituent on from 10% to 100% of the glucose anhydride units in the cellulose molecule to form on said fibers with the cellulose thereof an unsaturated, polymerizable derivative of cellulose, terminating the reaction before said fibers lose their physical fibrous form, and then copolymerizing such cellulose derivative on the fibers with a copolymerizable monomer containing at least one active double bond not more than one bond removed from an end of a carbon chain.

10. The method of converging a fibrous textile material, containing cellulose fibers, in any physical form and without substantial loss of its original physical form, into a cellulose-resin composite in which the cellulose and resin are chemically combined, and adjacent fibers are physically discrete, which comprises first reacting upon said material with an unsaturated, polymerizable compound selected from the group consisting of acrylic acid and its two methyl derivatives, methacrylic and crotonic acids, and allyl alcohol and its two methyl derivatives, methallyl and crotyl alcohols, to form on said fibers with the cellulose thereof an unsaturated, polymerizable derivative of cellulose, the reaction averaging only one substituent on from about 10 to 100% of the glucose anhydride units in the cellulose molecule, and then copolymerizing such cellulose derivative on the fibers with a copolymerizable monomer.

11. The method of converting a fibrous textile material, containing cellulose fibers, in any physical form and without substantial loss of its original physical form, into a cellulose-resin composite in which the cellulose and resin are chemically combined, and adjacent fibers are physically discrete, which comprises first reacting upon said material with an unsaturated, polymerizable allyl compound capable of reacting with an alcohol, employing a part only of the hydroxy groups sufficient to give at least one substituent on from 10% to 100% of the glycose anhydride units in the cellulose molecule to form on said fibers with the cellulose thereof an unsaturated, polymerizable ether of cellulose, terminating the reaction before said fibers lose their physical fibrous forms, and then copolymerizing such cellulose derivative on the fibers with a copolymerizable monomer.

12. A fabric containing cellulose fibers and having a vinyl resin finish that is completely permanent to launderings, the resin and cellulose of said fibers being chemically combined as a copolymer of cellulose acrylate and a copolymerizable monomer, the cellulose fibers being the original fibers in physical form but topochemically modified.

13. The method of treating a textile material, containing cellulose fibers, in any physical form to impart to it a wide range of finishes that are completely permanent under laundering, which comprises incompletely converting a part only of the cellulose of said fibers by reaction with acrylic acid into cellulose acrylate, terminating the conversion before the cellulose fibers lose their fibrous form, and then copolymerizing the cellulose acrylate on said cellulose fibers with a copolymerizable monomer containing at least one active double bond, not more than one bond removed from an end of a carbon chain.

14. The method of converting a fibrous textile material, containing cellulose fibers, in any physical form and without substantial loss of its original physical form, into a cellulose-resin composite in which the cellulose and resin are chemically combined, and adjacent fibers are physically discrete, which comprises reacting upon said material with an unsaturated, polymerizable acid compound capable of reacting with an alcohol, to form on said fibers with the cellulose thereof an unsaturated, polymerizable ester of cellulose, terminating the reaction before said fibers lose their physical fibrous form, and then copolymerizing such cellulose derivative on the fibers with a copolymerizable monomer.

15. A fabric containing cellulose fibers and having a vinyl resin finish that is completely permanent to launderings, the resin and cellulose of said fibers being chemically combined as a copolymer of cellulose methacrylate and a copolymerizable monomer, the cellulose fibers being the original fibers in physical form but topochemically modified.

16. The method of treating a textile material, containing cellulose fibers, in any physical form to impart to it a wide range of finishes that are completely permanent under laundering, which comprises chemically converting a part only of the cellulose of said fibers into cellulose methacrylate, terminating the conversion before the cellulose fibers lose their fibrous form, and then copolymerizing the cellulose methacrylate on said cellulose fibers with a copolymerizable monomer containing at least one active double bond, not more than one bond removed from an end of a carbon chain.

References Cited in the file of this patent

UNITED STATES PATENTS

| | | |
|---|---|---|
| 1,897,026 | Karrer | Feb. 7, 1933 |
| 2,186,101 | Dreyfus | Jan. 9, 1940 |
| 2,264,229 | Wallach | Nov. 25, 1941 |
| 2,336,985 | Freund | Dec. 14, 1943 |
| 2,455,083 | Musser | Nov. 30, 1948 |
| 2,468,716 | Nyquist et al. | Apr. 26, 1949 |

FOREIGN PATENTS

| | | |
|---|---|---|
| 394,722 | Great Britain | July 6, 1933 |
| 395,737 | Great Britain | July 24, 1933 |